United States Patent [19]
Hong et al.

[11] Patent Number: 5,979,236
[45] Date of Patent: Nov. 9, 1999

[54] BALANCING APPARATUS

[75] Inventors: Min-pyo Hong; Chang-woo Lee, both of Kyonggi-do, Rep. of Korea

[73] Assignee: Samsung Electronics Co., Ltd., Kyungki-do, Rep. of Korea

[21] Appl. No.: 09/007,763

[22] Filed: Jan. 15, 1998

[30] Foreign Application Priority Data

Jan. 15, 1997 [KR] Rep. of Korea .......................... 97-985

[51] Int. Cl.⁶ .................................................. G01M 1/00
[52] U.S. Cl. ........................................... 73/458; 74/573 F
[58] Field of Search .............................. 73/458, 468, 469, 73/470, 66, 457, 1.14; 74/573 R, 573 F

[56] References Cited

U.S. PATENT DOCUMENTS

| | | | |
|---|---|---|---|
| 3,433,534 | 3/1969 | Mercer | 73/458 |
| 3,812,724 | 5/1974 | Curtz et al. | 73/458 |
| 4,517,822 | 5/1985 | Bigret | 73/458 |
| 5,197,010 | 3/1993 | Andersson | 364/463 |
| 5,354,186 | 10/1994 | Murtuza et al. | 417/474 |

*Primary Examiner*—Hezron Williams
*Assistant Examiner*—Richard A. Moller
*Attorney, Agent, or Firm*—Sughrue, Mion, Zinn, Macpeak & Seas, PLLC

[57] ABSTRACT

A balancing apparatus which is capable of compensating for an eccentricity generated even when a rotating member is rotated at a velocity that is lower than a critical velocity thereof. Preferably, the balancing apparatus is disposed, in relation with the rotating member, at a position spaced apart from a rotation center of the rotating member by a predetermined distance. The balancing apparatus includes a plurality of balls for compensating for an eccentricity, a hardening agent for fixing the balls under the condition that the eccentricity is compensated by the balls, and a keeping member for insertion of the balls and the hardening agent.

12 Claims, 3 Drawing Sheets

BALANCING APPARATUS

BACKGROUND OF THE INVENTION

1. Field of the Invention

The present invention relates to a balancing apparatus utilizing an ultraviolet hardening agent and a ball for preventing a rotating member that is rotated at a super high velocity such as a VTR head driving apparatus, a laser scanning unit and the like, from being vibrated or oscillated due to an imbalance generated by inequality in the material and the shape of the rotating member.

2. Description of the Related Art

As widely known, a balancing apparatus is provided to remove an imbalance generated due to inequality of the material density of and incomplete circular shape of a shaft that is rotated at a super high velocity. The balancing apparatus includes a ring-shaped hoop installed on the shaft, a ball freely moved in the hoop and an operational fluid introduced into the hoop, for preventing the ball from being suddenly moved and removing a minute rotational imbalance. When the shaft is rotated at a velocity higher than a critical velocity thereof, the ball and the fluid of the balancing apparatus are automatically located at a position where the eccentricity is compensated. The critical velocity is a velocity when the eccentricity begins to be compensated for by the ball and the operational fluid.

A conventional VTR head driving apparatus including such a balancing apparatus for removing such as an imbalance will be described with reference to FIG. 1 hereinafter.

FIG. 1 shows an upper drum 20 which a head tip 10 for reading audio and video signals written on a VTR tape is fixed to.

The upper drum 20 is connected to a rotation power generating unit (not shown). A ring-shaped groove 30 having a little smaller diameter than the upper drum 20 is formed in an upper surface of the upper drum 20. A predetermined number of balls 40 that are solid balancers having a predetermined density are inserted into the groove 30. A fluid 50 that is a liquid balancer having a predetermined density is also introduced into the groove 30. The fluid 50 prevents the balls 40 from being suddenly moved and adjusts a minute imbalance generated on the upper drum 20.

The amount of the fluid 50 introduced into the groove 30 is, preferably, ranged from ⅓ to ½ of the ring-shaped groove 30.

An opening of the ring-shaped groove 30 including the balls 40 and the fluid 50 is closed by a cover 60 for preventing the balls 40 and the fluid 50 from flying out of the groove 30. The cover 60 has a shape that is similar to and larger than the opening of the groove 30.

The operation of the conventional balancing apparatus will be described hereinafter.

First, when power is supplied to a rotation power generating unit (not shown), the upper drum 20 begins to be rotated in association with a shaft A connected to the rotation power generating unit. The rotations per minute of the upper drum 20 increase according to an increase in the angular acceleration of the rotation power generating unit. After a predetermined amount of time, the upper drum 20 is rotated at a constant velocity ranging from 4000 to 9000 R.P.M.

However accurately and precisely the upper drum 20 is fabricated, when the upper drum 20 is rotated at a super high velocity, several milligrams of imbalance is inevitably generated on the upper drum 20 due to a minute asymmetry in the shape of and inequality of the material density of the upper drum 20. The imbalance is compensated for by the balls 40 and the fluid 50 of the balancing apparatus formed in the upper drum 20, in such a manner that the balls 40 and the fluid 50 are moved to a position that is symmetrical to a position that the imbalance is generated. This results in an enhanced rotation stability of the upper drum 20.

The balls 40 and the fluid 50 of the conventional balancing apparatus are capable of compensating for only the imbalance generated when the rotating member, i.e. the upper drum 20, is rotated at a velocity that is higher than a critical velocity of the upper drum 20. Accordingly, the imbalance compensating ability of the conventional balancing apparatus is considerably reduced when the rotating member is rotated at a velocity that is lower than the critical velocity. As a result, the performance and the life of the rotating member may be also reduced because the rotating member may be vibrated and oscillated by the rolling movement of the balls until a rotating velocity of the rotating member reaches the critical velocity of the rotating member.

SUMMARY OF THE INVENTION

It is therefore an object of the present invention to provide a balancing apparatus capable of compensating an imbalance generated on a rotating member even before a rotating velocity of the rotating member reaches a critical velocity of the rotating member.

The above and other objects are provided according to the present invention by providing a balancing apparatus comprising: a rotating member; and an eccentricity compensating member which is combined with the rotating member in spaced apart relation from a rotation center of the rotating member in such a manner that a rotation center thereof is coincident with a rotation center of the rotating member, wherein the eccentricity compensating member changes its state from a liquid state to a solid state by a predetermined stimulation when the rotating member is rotated at a velocity that is higher than a critical velocity, and thereby eccentricity generated on the rotating member when the rotating member is rotated at a velocity that is lower than the critical velocity is compensated.

Preferably, the eccentricity compensating member comprises: a plurality of balls; a hardening agent for fixing the ball; and a keeping member for insertion of the ball and the hardening agent.

The hardening agent is an ultraviolet hardening agent that changes its state from a liquid state to a solid state when exposed to ultraviolet rays.

The keeping member, according to an embodiment, may be a groove which has a ring shape having a predetermined width and a predetermined depth and is formed in the rotating member, or a vessel which has a shape corresponding to the groove and is inserted into the ring shaped groove. Preferably, a cover is attached to an opening of the groove and the vessel. More preferably, the cover is formed of a transparent material.

The groove may have a sectional cross section of a rectangular, a circular, a triangular, or a D shape.

BRIEF DESCRIPTION OF THE DRAWINGS

The above objects and other advantages of the present invention will become more apparent by describing in detail the preferred embodiments thereof with reference to the accompanying drawings, in which.

DETAILED DESCRIPTION OF THE PREFERRED EMBODIMENTS

The accompanying drawings, which are included to provide a further understanding of the present invention and are incorporated in and constitute a part of this specification, illustrate embodiments of the present invention, and serve to explain the principles of the present invention together with the description.

The balancing apparatus according to the present invention will be described in detail, referring to FIG. 2.

Figure 1:
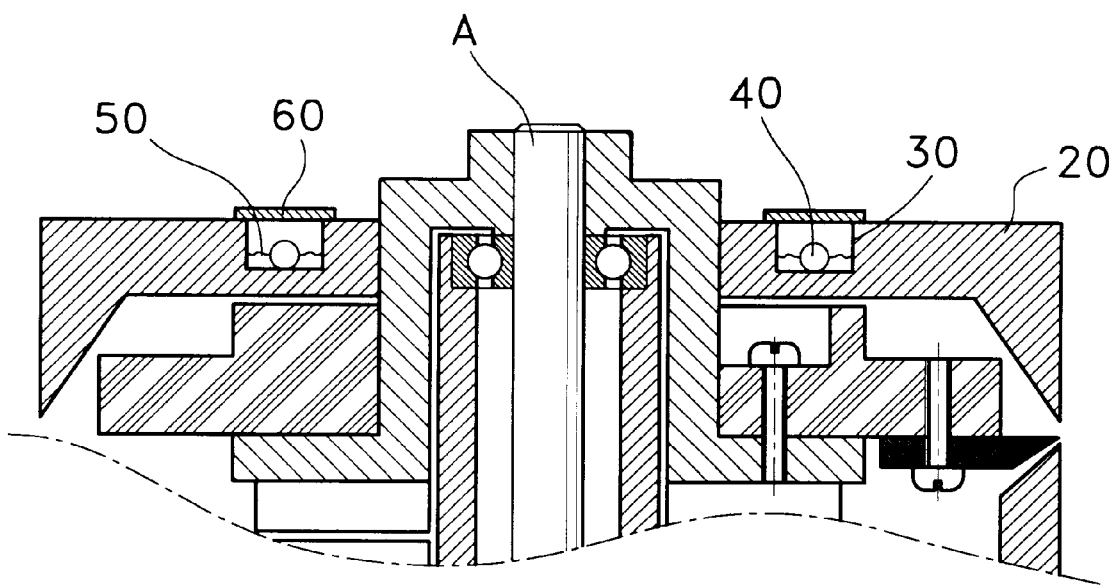
FIG. 1 is a cross sectional view of a VTR head drum including a conventional balancing apparatus.
Figure 2:
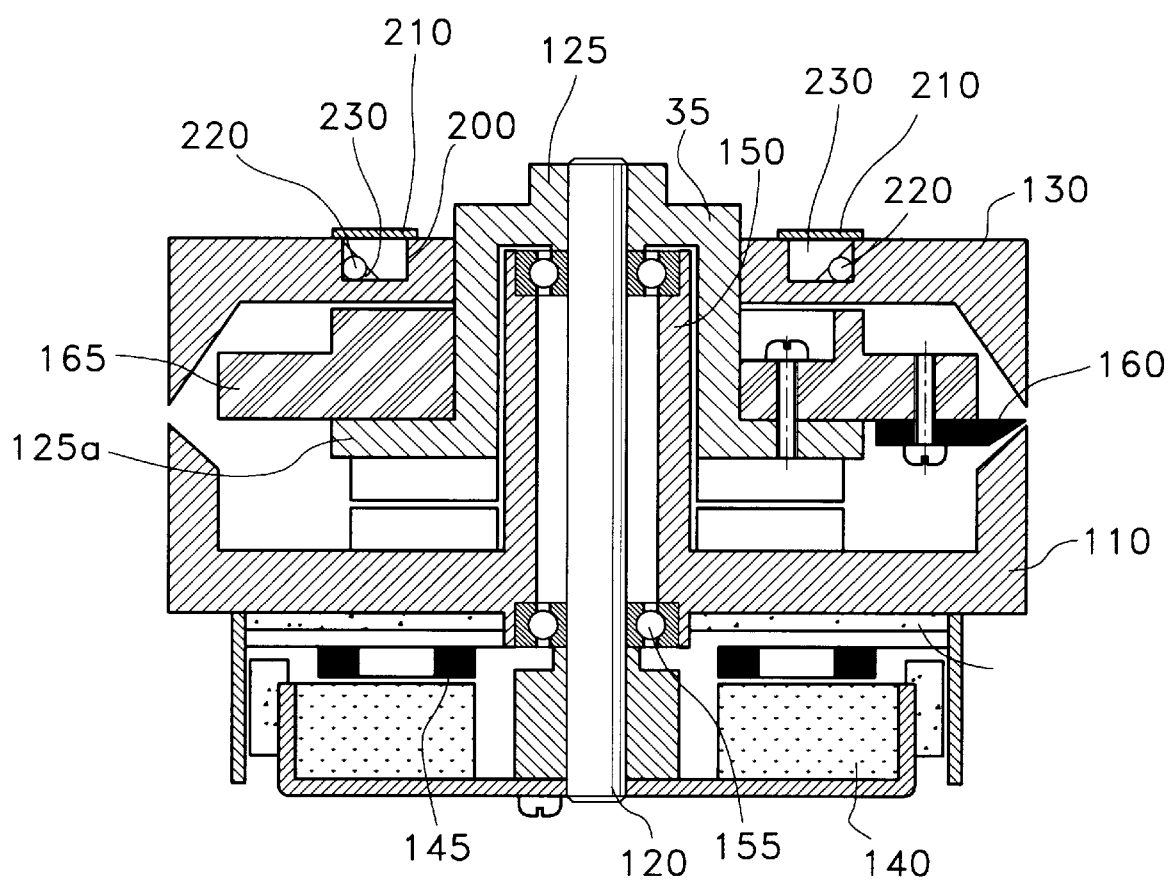
FIG. 2 is a cross sectional view of an embodiment of a VTR head drum including a balancing apparatus according to the present invention.

As shown in FIG. 2, the VTR head driving apparatus typically comprises: a lower drum 110 which is fixed; an upper drum 130 which is press-fitted to a shaft 120 that is rotated by a predetermined velocity; and a rotor 140 and a stator 145 which are driving apparatuses for rotating the upper drum 130.

The lower drum 110 is fixed to a separate drum base (not shown) that is settled on a deck plate (not shown) by means of a clamping screw and the like. A bushing 150 is formed by projecting a center portion of the lower drum 110 upward to have a predetermined height and a predetermined diameter.

A shaft 120 combined with the rotor 140 is fitted into an inner ring of a ball bearing 155. An outer ring of the ball bearing 155 is installed on an inner surface of the bushing 150 of the lower drum 110. The shaft 120 is fitted into a semi-drum 125. The semi-drum 125 is connected to the upper drum 130.

The semi-drum 125 includes a head settling member 125a for settlement of a rotary disk 165 to which a head tip 160 for reading audio and video signals is fixed.

Centrifugal force generated when the upper drum 130 is rotated at a high velocity cannot be uniformly distributed because of an imbalance generated in association with an inequality of the material of and the shape of the upper drum 130. This results in an instability of the rotations.

Accordingly, in an embodiment of the present invention, a ring shaped groove 200 having a predetermined depth and a predetermined width is formed at a position that is spaced apart from a rotation center of the upper drum 130 by a predetermined distance in order to compensate for the imbalance generated on the upper drum 130. A cover 210 is attached to an opening of the groove 200. The cover 210 is, preferably, formed of a transparent material so that ultraviolet rays can be transmitted through the cover 210.

A plurality of balls 220 for compensating for the imbalance by the rolling movement thereof are inserted into the groove 200. A hardening agent 230 is introduced into the groove 200 to limit the movement the balls 220 under a predetermined condition. The hardening agent changes its state from a liquid state to a solid state by a predetermined stimulation.

The hardening agent 230 may be an ultraviolet hardening agent in a liquid state, for example, an ultraviolet hardening agent made by Three-bond Co., Ltd. of Japan, that changes its state from a liquid state to a solid state by stimulation of ultraviolet rays.

It is apparent to those skilled in the art that the shape of the groove may be modified to a rectangular, a triangular, a circular, a D-shaped groove or the like.

Figure 3:
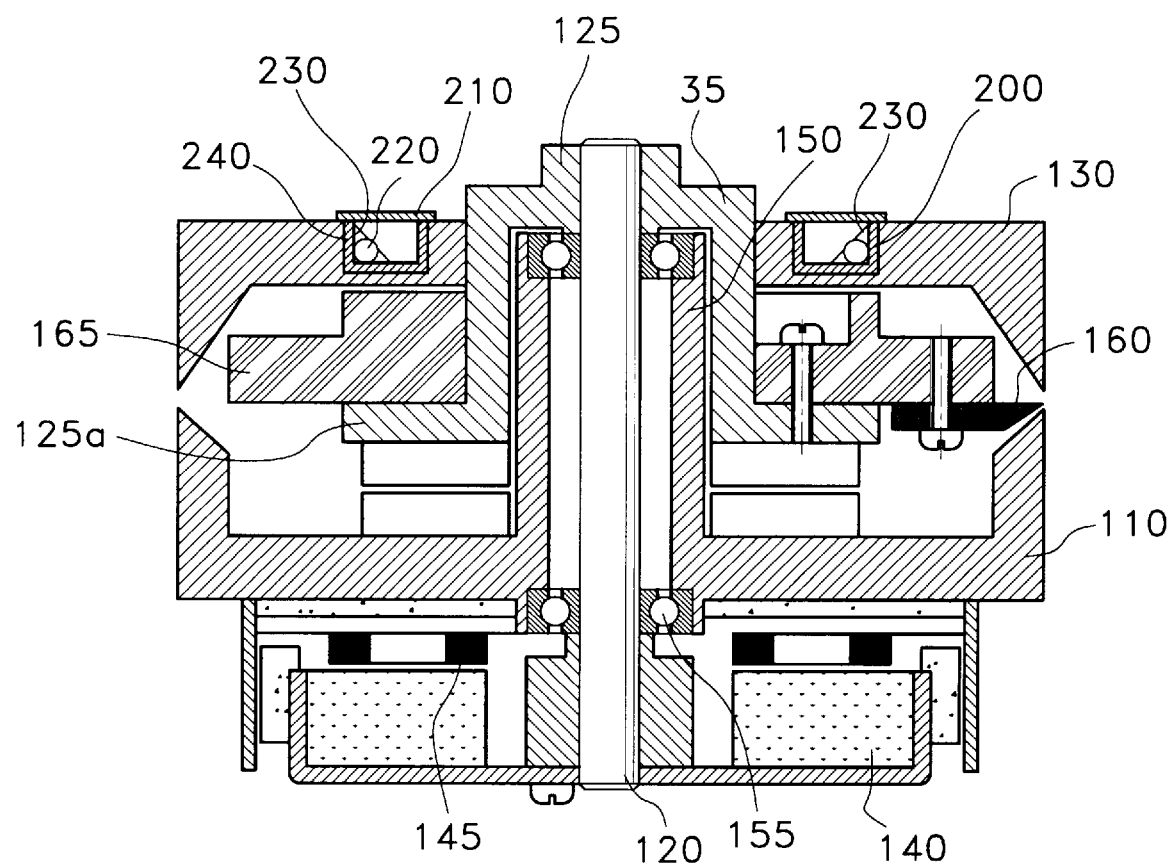
FIG. 3 is a cross sectional view of another embodiment of a VTR head drum including a balancing apparatus according to the present invention.

Another embodiment of the present invention is shown in FIG. 3. The embodiment of FIG. 3 further comprises a transparent vessel 240 having a shape corresponding to a ring shaped groove 200 having a predetermined depth and a predetermined width that is formed in the upper drum 130. The vessel 240 includes an opening on an upper portion thereof and is inserted into the groove 200. The opening of the vessel 240 is covered by a cover 210.

A plurality of balls 220 are inserted into the vessel 240 to compensate for an imbalance of the upper drum 130 by rolling movement thereof. In order to limit the movement of the balls 220, a hardening agent 230 that changes its state from a liquid state to a solid state by a predetermined stimulation is also inserted into the vessel 240.

The operation of the above described embodiments will be described hereinafter.

The balls 220 and the ultraviolet hardening agent 230 are inserted into the groove 200 or the vessel 240 formed in the upper drum 130. When the upper drum 130 is rotated at a velocity that is higher than a critical velocity of the upper drum 130, the ultraviolet hardening agent 230 in its liquid state and the balls 220 are moved to a position that eccentricity generated at this time can be minimized. The critical velocity is a minimum number of rotations per minute of the rotating member, i.e. the upper drum 130, when the generated eccentricity can be minimized by the balls and the ultraviolet hardening agent in its liquid state.

If the position of the balls 220 and the ultraviolet hardening agent 230 is determined, ultraviolet rays are applied from a portion over the upper drum to the balancing apparatus. As a result, the ultraviolet hardening agent 230 changes its state to a solid state. At this time, since the cover 210 is attached to the opening of the groove 200 or the vessel 240, the ultraviolet hardening agent in its liquid state can be prevented from flying before changing into its solid state.

As a result that the ultraviolet hardening agent 230 changes its state to the solid state, the balls 220 are completely fixed to the position that the eccentricity can be minimized even when the upper drum 130 is rotated at a velocity that is lower than the critical velocity. Furthermore, the balls 220 and the ultraviolet hardening agent 230 can be located at the position that the eccentricity can be compensated for even after the upper drum 130 stops rotating.

Therefore, once balanced, the eccentricity generated on the upper drum 130 can be permanently compensated for and thereby vibration and oscillation that may occur when the upper drum is rotated can be prevented. This results in an enhanced performance and life of the rotating member.

This invention has been described above with reference to the aforementioned embodiments. It is evident, however, that many alternatives, modifications and variations will be apparent to those skilled in the art in light of the foregoing description. Accordingly, it is intended to embrace all such alternatives, modifications and variations as fall within the spirit and scope of the appended claims.

For example, the balancing apparatus may be formed out of the rotating member without any degradation of the efficiency. The balancing apparatus formed out of the rotating member includes a keeping member having a ring shape, for insertion of the balls and the hardening agent. The ring shaped keeping member is connected to the rotating member by a connecting member and has a rotation axis that is coincident with a rotation axis of the rotating member.

Moreover, for example, the balancing apparatus may be formed, without any degradation of the efficiency, in such a manner that a predetermined number of balls are inserted into the ring-shaped groove 200 and fixed by a hardening agent fed into the ring-shaped groove 200 and ultraviolet rays applied from external separate apparatuses when the rotating member is rotated at a velocity higher than a critical velocity thereof and the plurality of balls are located at a position where the imbalance is compensated.

It is contemplated that numerous modifications may be made to the balancing apparatus of the present invention without departing from the spirit and scope of the invention as defined in the following claims.

What is claimed is:

1. A balancing apparatus comprising:

a rotating member; and an eccentricity compensating mechanism which compensates for an eccentricity in rotation of the balancing apparatus, said eccentricity compensating mechanism which is combined with said rotating member in spaced apart relation from a rotation center of said rotating member in such a manner that a rotation center of said eccentricity compensating mechanism is coincident with a rotation center of said rotating member, wherein said eccentricity compensating mechanism changes its state from a liquid state to a solid state by application of an external energy when said rotating member is rotated at a velocity that is higher than a critical velocity of said rotating member, and thereby eccentricity generated on said rotating member when said rotating member is rotated at a velocity that is lower than the critical velocity is compensated.

2. The balancing apparatus according to claim 1, wherein said eccentricity compensating mechanism comprises:

a plurality of balls;

a hardening agent for fixing said plurality of balls; and a keeping member for insertion of said plurality of balls and said hardening agent.

3. The balancing apparatus according to claim 2, wherein said external energy, ultraviolet rays, and said hardening agent is an ultraviolet hardening agent.

4. The balancing apparatus according to claim 2, wherein said keeping member is a groove which is formed in said rotating member in a ring shape having a predetermined width and a predetermined depth.

5. The balancing apparatus according to claim 4, wherein a cover is attached to an opening formed on an upper portion of said groove.

6. The balancing apparatus according to claim 2, wherein said keeping member is a keeping vessel which is formed in a ring shape having a predetermined width and a predetermined depth, and inserted into a groove formed in said rotating member.

7. The balancing apparatus according to claim 6, wherein a cover is attached to an opening formed on an upper portion of said keeping vessel.

8. The balancing apparatus according to claim 5 or 7, wherein said cover is formed of a transparent material.

9. The balancing apparatus according to claim 4 or 6, wherein a sectional cross section of said groove has a rectangular shape.

10. The balancing apparatus according to claim 4 or 6, wherein a sectional cross section of said groove has a circular shape.

11. The balancing apparatus according to claim 4 or 6, wherein a sectional cross section of said groove has a triangular shape.

12. The balancing apparatus according to claim 4 or 6, wherein a sectional cross section of said groove has a D shape.

* * * * *